A. Y. DODGE.
TRAIN CONTROL SYSTEM.
APPLICATION FILED JAN. 28, 1914.
1,298,676.
Patented Apr. 1, 1919.
2 SHEETS—SHEET 2.
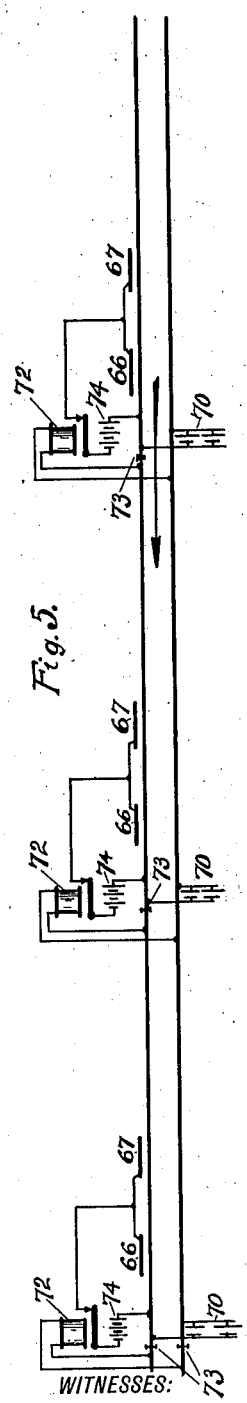
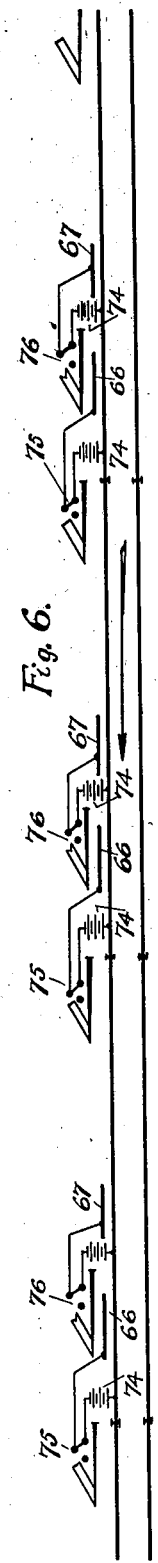
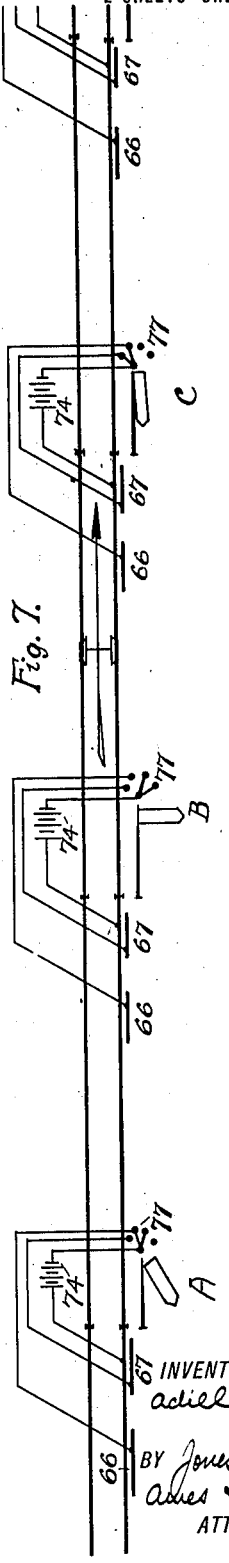
WITNESSES:
INVENTOR
BY
ATTORNEYS

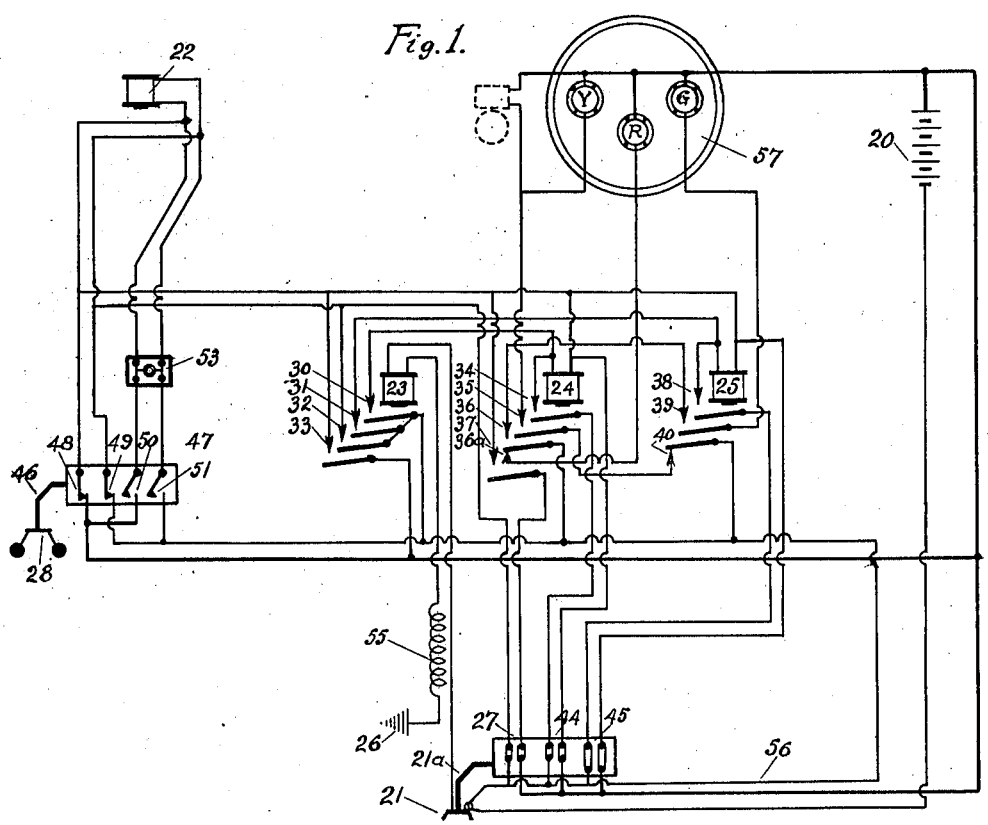

UNITED STATES PATENT OFFICE.

ADIEL YEAMAN DODGE, OF CHICAGO, ILLINOIS.

TRAIN-CONTROL SYSTEM.

1,298,676. Specification of Letters Patent. Patented Apr. 1, 1919.

Application filed January 28, 1914. Serial No. 815,010.

*To all whom it may concern:*

Be it known that I, ADIEL YEAMAN DODGE, a citizen of the United States, residing at Chicago, in the county of Cook and State of Illinois, have invented new and useful Improvements in Train-Control Systems, of which the following is a full, clear, concise, and exact description, reference being had to the accompanying drawing, forming a part of this specification.

My invention relates to improvements in railroad automatic cab signaling and train control systems.

The principal objects of my invention are:—

First; to provide a system by which a train stop is operated with the utmost degree of safety, and with ample signals to the engineman.

Second; to provide a system whereby failure of any essential part will cause a service application of the brakes, the electric circuits being so arranged that the occurrence of a break, cross or ground, or a failure of the source of energy in any of the important circuits will cause the application of the brakes and the giving of a stop signal to the engineman.

Third; to provide a system controlled automatically by track circuits.

Fourth; to provide means so that the so-called permissive signaling system may be used.

Fifth; to provide a train control system, designed to operate the stop only when it is necessary to correct mistakes and enforce the rules.

Sixth; to provide a definite signal for "stop", "proceed", and "caution", one of which is showing all the time.

Seventh; to provide a means whereby the engineman can pass a stop signal by the permissive system if he runs at a predetermined reduced speed.

One form of apparatus for obtaining these and other objects is illustrated in the accompanying drawings, in which;

Figure 1 is a diagram of the cab wiring and signal equipment;

Fig. 2 is a plan view of vertical displacement ramps;

Fig. 3 is a side elevation of same ramps;

Fig. 4 is a plan view of lateral displacement ramps;

Fig. 5 is a diagrammatic view of one track of a double track road, equipped with ramps;

Fig. 6 is a similar view showing the ramps used in connection with two position semaphore block signals; and Fig. 7 is a similar view showing the ramps used in connection with three position semaphore block signals.

Fig. 1 illustrates diagrammatically the preferred arrangement of the cab circuits. A suitable source of current 20 is provided. A shoe 21 is carried by the engine and engages with suitable distant and home ramps mounted alongside the track. The home ramp is arranged to displace the shoe relatively about an inch and a half or so farther than does the distant ramp. The track circuits and ramps are normally energized. There are three signal lights in the cab, R, G, and Y, which are red, green and yellow, respectively, indicating danger, track clear—proceed, and caution. In order that the engineer may have but one point to watch, and for other obvious advantages, the lights are all placed under a single dome, as represented at 57. The magnet of a suitable electromagnetic air brake valve is indicated at 22.

The electromagnetic apparatus is illustrated diagrammatically and as so illustrated includes the relays 23, 24 and 25 of the well known railroad signal type.

In accordance with the arrangement shown in Fig. 1, every piece of apparatus on the cab which depends on the source of current 20 for its operating energy is in series with the wire 56 which is mechanically fastened to the shoe 21, so that if said shoe should be accidentally broken off the wire would be broken, the signal lights in the cab extinguished and the automatic stop applied. The shoe 21 is connected in series with the relay 23, which is operated by the current flowing from the ramps, and thence to the wheels of the train and the return side of the circuit, as indicated at 26. This shoe is for the purpose of detecting whether or not the signal ramps mounted alongside the track are energized. The shoe 21 in practice is connected by means of a crank 21$^A$ or any other suitable means with a circuit controller of the well known signal type, which I have indicated diagrammatically as having three pair of contacts 27, 44 and 45. The lifting of the shoe 21 at the distant ramp suffices to open the pair of contacts 45 only. The further lifting of the shoe at the home ramp opens contacts 27 and 44, and again opens the contacts 45. This difference in time of opening these contacts I have indicated by their different horizontal locations in the diagram.

The stop magnet 22 is operated by current from the source 20. The circuit of this magnet is broken at every home ramp, regardless of the condition of the track and of the signal to be given. This is done by the lifting of the contact shoe 21 by the home ramp, which breaks the circuit at contacts 27. If, however, the home signal ramp is energized, indicating that the track is clear, a branch circuit hereinafter described will be established around the break 27, to maintain the stop magnet 22 energized.

A governor 28 is also provided in order to permit the train to be run at moderate speeds after the danger signal is given, if the so-called permissive system is in vogue. This speed is regulated by the adjustment of the governor before starting on the trip, such speed being, say, from three to fifteen miles per hour. This governor is so arranged that when the red or stop signal is given the engineman is able to proceed at the predetermined slow rate only.

By this or equivalent arrangement of the circuits and apparatus I am enabled to use an automatic stop operated by an electromagnet on a normally closed circuit, which circuit when broken is capable of being closed by two branch circuits, one in connection with the governor and another in connection with relay 23.

Assuming that an engine equipped with the cab circuit and apparatus shown in Fig. 1 approaches the distant signal ramp of a block, the shoe 21 detects whether the ramp is energized or deënergized. If energized, the current from the distant ramp enters the shoe 21, passing thence through the relay 23 into the wheels and back along the return rail. This relay attracts all of its armatures corresponding with contacts 30, 31, 32 and 33, contacts 30 and 31 closing the circuits to relays 24 and 25 and contact 33 closing the return side of their circuit. These relays are then energized by current from battery 20 to give the proceed signal by lighting the green light through contacts 39 of relay 25 and 36 of relay 24.

When the ramp is passed, relay 23 is deënergized, but relays 24 and 25 remain energized through their own retaining circuits including contacts 34 and 38 respectively, and the contacts 44 and 45 of the circuit controller. The arrangement is such that as the shoe passes off the ramp the contacts 27, 44 and 45 of the controller are closed before relay 23 is deënergized.

When the relays 24 and 25 are up and the green light is displayed the circuit leading to the stop magnet 22 is closed, even though the branch through the speed governor 47 is opened. This is accomplished through contact 37 of relay 24 and contact 27 of the circuit controller. This remains true until the shoe 21 reaches a home signal ramp. When this occurs, the circuit of magnet 22 is opened at contacts 27 by the lifting of the shoe 21 as before explained. But if the shoe 21, while on the home signal ramp, is receiving current, then the relay 23 will be operated, which closes a normally open branch circuit of the stop magnet 22 through the contacts 32 and 33 to maintain the same energized during the time that the shoe 21 is holding the said circuit open at the point 27. The circuit is again closed at contacts 27 before shoe 21 leaves the end of the home ramp, by the descent of the shoe 21 on the downwardly curved end of said ramp.

Under these circumstances, therefore, when the distant and home signal ramps are both energized, thus indicating that the track is clear in advance, the green only is lighted and the stop magnet 22 is maintained energized. The engineer therefore understands that he may proceed at full speed.

Should, however, a train be in the block ahead, or if for any other reason the signal rails are deënergized, the shoe 21 upon striking the distant signal ramp will receive no current therefrom, and the relay 23 will not pick up its armatures, as in the former instance. When the shoe 21 mounts the distant signal ramp it breaks contacts 45 which are in the retaining circuit of relay 25, and if the relay 25 has been previously operated as above explained, this causes it to open the circuit of the green light and to close its back contact 40 which lights the yellow light through contact 35 (as relay 24 is still energized) and contact 40 and also gives an audible alarm (see dotted lines) which is preferably not a continuous alarm. This signal indicates to the engineman that there is some obstruction ahead and that he should proceed with caution.

It will be noted that at this time the automatic stop is not operated because its circuit remains closed at contact 37 of relay 24, and contact 27 of the circuit controller is not yet broken.

If when the home signal rail is reached the obstruction still exists, no current passes from the ramp to shoe 21, and relay 23 remains deënergized. Shoe 21, however, is lifted enough so that the stop magnet circuit is broken at 27. Contact 44 also breaks and contact 45 breaks again. This deënergizes relay 24, and relay 25 remains down, thus completing the circuit of the red light R through back contact 36^A of relay 24 which is lighted to indicate to the engineer that the track is not clear. At the same time the automatic stop magnet is deënergized. This magnet preferably controls a device for gradually applying the brakes of the train, and which device may be constructed as shown in my co-pending application, Serial No. 815,009, filed January 28, 1914. That is, this will be true if the speed of the train is such that the speed controller is not effective in closing its branch of the stop magnet circuit.

If the train is brought to a standstill in contact with the home ramp and if the rules require the engineman to remain there until the track is clear ahead, he will receive the proceed signal as soon as the signal ramps are again energized. This may occur by the passing on of the train in the block ahead, (or it may be given by the despatcher from his station, if the block is so equipped). As soon as the home signal ramp is energized while the train is in this position, current passes therefrom through shoe 21 and relay 23, causing the same to lift its armatures, thus again energizing both relays 24 and 25 and holding them until the shoe has demounted from the crest of the ramp and the circuit controller contacts 27, 44 and 45 again close to maintain relays 24 and 25 energized after relay 23 drops. The attraction of relays 24 and 25 extinguishes the yellow and red lights and again lights the green light, as before explained, to indicate to the engineer that he may proceed. At the same time the circuit through the stop magnet 22 is completed from battery 20 through the contact points 33 and 32 to hold the automatic stop closed, and the engineman is at liberty to proceed.

If the trains are being operated under the permissive operation rules, that is, rules which permit the trains to proceed slowly after receiving the danger signal the engineman may proceed slowly within the range of the governor 28. This governor may be any suitable speed indicator or governor, connected with a circuit controller 47. For the purpose of illustration, in Fig. 1 I show an operating connection 46 between the governor and a circuit controller 47 of any suitable type. Contacts 48 and 49 of this device are arranged to be closed only at a range of speed, say, from three to fifteen miles per hour. When the train is traveling at that speed contacts 48 and 49 are closed forming a branch circuit around the other breaks in the circuit of stop magnet 22. This circuit through the branch referred to may be traced from battery 20 to shoe 21, contact 49 of controller 47, thence by wire 52 to magnet 22, thence by return conductor and contact 48 to the opposite pole of the battery. This circuit obviously will be maintained so long as the train is traveling at such reduced speed, say from three to fifteen miles per hour. At any greater speed the circuit will be broken by the governor at contacts 48 and 49 and the stop magnet 22 will be deënergized and the train stopped, provided, the red light is burning.

It will be noted that if the green light is burning the governor has no operative relation with the stop magnet at any speed.

Assuming that the train is proceeding at a reduced speed and comes in contact with an energized distant ramp and relay 23 picks up, and in turn picks up relays 24 and 25 as before described. Relays 24 and 25 will close upon contacts 36 and 39, thereby completing the circuit for the green light as well as for the stop magnet 22, and the engineman is at liberty to proceed at full speed. When he reaches the corresponding home signal ramp it should be likewise energized, and current will be conducted into the relay 23 and the respective armatures attracted. Relay 23 closes the circuit at 33 and 32 so that the stop magnet 22 will not be deënergized. When the shoe 21 breaks the circuit at 27, relays 24 and 25 are retained energized through contacts 30 and 31, continuing the green signal and the engineman may proceed at full speed. When the signal rail is passed relay 23 will be deënergized and its armatures returned to normal position.

The circuit controller 47 may be of any suitable type and is driven by the speed controller 28. It has four contacts, 48, 49, 50 and 51. Contacts 50 and 51 are closed only at speeds of the train of, say, from 0 to 3 miles per hour, and contacts 48 and 49, as before described, are closed only at speeds, say, from 3 to 15 miles per hour.

With this arrangement, should the driving connections of the circuit controller fail for any reason, the contacts 50 and 51 would be closed; they are also closed when the train is standing still. They are placed in an auxiliary branch of the circuit of magnet 22 together with switch 53 which is preferably such as is normally open and is closed manually and which must be held closed manually, if it is to be kept closed.

Should the red light be lighted when the train is standing still, which means that relay 24 is deënergized and its armatures are down resting against contact 36A, the engineman could only release all brakes by pushing the switch button 53. By holding his hand upon this button or switch 53 he is enabled to close the circuit through the stop magnet 22 and thus operate the train until it has reached such a speed that the governor closes the contacts 48 and 49, this speed being, as before stated, from three to fifteen miles per hour. This enables the engineman to start his train and proceed at a slow speed under the permissive rules above mentioned, even in case the train should have been brought to a complete standstill before the engineman decided to so proceed. If the governor should be out of commission, however, so that the contacts 50 and 51 are closed, the engineman could proceed only by retaining 53 closed until he received the green light to proceed.

In Fig. 1, 55 designates a choke coil of any desired type to check the flow of alternating current into the relay 23 from the shoe 21 when direct current is the power used for signaling.

Fig. 2 is a plan view of a portion of a railroad track with home and distant ramps of the vertical displacement type placed alongside. The rail 65 has a section broken out so the home ramp 66 and the distant ramp 67 can be shown together.

Fig. 3 is a side elevation of the same ramps showing the home ramp 66 relatively higher than the distant ramp 67.

Fig. 4 is a plan view of a portion of railroad track with home and distant ramps of the horizontal displacement type placed alongside one of the running rails 65. Home ramp 68 displaces the shoe farther to the side than does the distant ramp 69. This takes the place of the vertical displacement of ramp 66; their functions are the same—operating the circuit breaker by displacing the shoe 21 horizontally instead of vertically, the circuit breaker or controller being arranged therefor.

Fig. 5 diagrammatically illustrates a track of a railroad equipped with track batteries 70, track relays 72 and insulated joints 73. The track relays operate in the usual way, the track circuit can be either single sectional rail or both rails may be divided as desired. In connection with the track relays are the ramp batteries 74 connected through the armature of the relay 72 to one of the running rails and in parallel with the home ramp 66 and the distant ramp 67. The home ramp 66 is placed inside of the block at brake-stopping distance from the end of same. The distant ramp 67 is placed at brake-stopping distance farther in the block beyond the home ramp. They are placed in this manner to give the engineman his warning in time to stop over the home ramp and await his signal to proceed or slow down to the predetermined speed so that the brakes would not be applied at the stop signal, and he could proceed under the train control. The home ramp 66 is placed at brake-stopping distance within the block to provide room in which to stop should the home signal be disregarded by mistake.

Fig. 6 is a diagrammatical illustration of a similar track equipped with two position semaphore signals with ramps electrically connected through the circuit breakers 75 and 76 of said semaphores. The ramps can be energized by some convenient source of energy 74 placed alongside, or a common source placed centrally. The semaphore signals might be mechanically operated; or automatically operated from a track circuit. In either case the source 74 is placed in circuit with the running rail and one of the circuit breakers 75 or 76 thence to the respective ramp.

Fig. 7 diagrammatically shows the application of my invention to the three position semaphore type of signal, the direction of traffic being in the direction of the arrow. Considering the pair of wheels at the arrow, they have caused the signal directly behind them to go to danger and the one farther back to go to caution, and the signal ahead of them is still clear. The first signal A, at the left, has deënergized the distant ramp 67 which in this case is placed closer to the end of the block than the home ramp, but acts as the distant ramp for the signal B beyond. The next signal B to the right has deënergized both ramps; ramp 66 will operate the stop device under the conditions set forth in the preceding pages. The engineman can stop over ramp 67 and wait for a proceed signal if desirable. Signal C is clear and is holding both ramps energized, so the coming train may pass. The distant ramp 67 is placed opposite the signal in this case and the home ramp 66 is brake-stopping distance behind it.

It will be seen that, by my invention, I have provided a train control system that meets the demands of "safety first" and at the same time is simple and economical enough to be highly practical. It is furthermore a system that makes possible the prompt transmission of trains and removes the coefficient of human fallibility which is so often the salient element in railroad accidents.

It will be apparent from the foregoing description that numerous changes may be made in the form and arrangement of the parts without departing from the spirit of the invention or exceeding the scope of the appended claims, the form of the invention herein described being merely one preferred embodiment thereof.

Having thus described my invention what I claim as new and desire to secure by Letters Patent is:

1. In a train control system, the combination with a plurality of signals, of a plurality of ramps forming distant and home signal points, a member carried by the train, and adapted to make contact with said ramps, a circuit breaker mechanically operated by said member, an open circuit relay in series with said member and actuated at every live ramp, and a plurality of self retaining relays excited by said first mentioned relay and coöperating to operate said signals, said self retaining relays being deenergized by said circuit breaker under desired conditions.

2. In a train control system, the combination with proceed and danger signals, of a plurality of ramps forming home and distant signal points, a member carried by the train adapted to make electrical contact with said ramps, a circuit breaker mechanically operated by the displacement of said member by said ramps, an open circuit relay in series with said member, a plurality of self retaining relays actuated by said first mentioned relay and coöperating to form circuits for said signals, said ramps being so arranged that the proceed signal may be given at either the distant or home ramp and the danger signal at the home ramp only.

3. In a train control system, the combination with a normally closed circuit including an electromagnetic train stop, of a plurality of ramps forming distant and home signal points, a member carried by the train adapted to make contact with said ramps, a circuit breaker mechanically operated by said member, an open circuit relay actuated by current from said ramps, two self retaining relays excited by said first named relay, a plurality of signals operated by the coöperation of said self retaining relays, said ramps being so arranged as to cause the circuit breaker to break said normally closed circuit at every home ramp, said first named relay serving to momentarily retain said stop magnet energized, said circuit breaker also causing one or the other of said self retaining relays to be deënergized at every dead ramp, thereby to cause the proper signal to be given.

4. In a train control system, the combination with proceed and caution and danger signals, of a plurality of ramps forming distant and home signal points, a member carried by the train and adapted to make electrical contact with said ramps, a circuit breaker operated by said member, a detector relay actuated by current from said ramps, a plurality of self retaining relays actuated by said first mentioned relay and coöperating to close a circuit including the proceed signal when said ramps are alive, the circuit of one of said self retaining relays being broken at every distant ramp, thereby closing a circuit including the caution signal when the ramp is dead, the circuit of another of said self retaining relays being broken at every home ramp, thereby closing a circuit including the danger signal when the ramp is dead, whereby one signal or another is constantly displayed.

5. In a train control system, the combination with a normally closed circuit including an electromagnetic train stop, of proceed, caution and danger signals, a plurality of ramps forming distant and home signal points, a member carried by the train and adapted to make contact with said ramps, a circuit breaker mechanically operated by the displacement of said member by said ramps, means including said circuit breaker for causing the proceed signal to be given at every live distant ramp and the caution signal at every  lead distant ramp, said home ramps being arranged to break said normally closed circuit, means including said circuit breaker for causing the danger signal to be displayed if said ramp is dead, the break in the circuit causing the stop to operate, and a branch circuit to maintain said stop magnet energized and to cause the proceed signal to be displayed if said ramp is alive.

6. In a train control system, the combination with a normally closed circuit including an electromagnetic train stop, of means for breaking said circuit under desired conditions, means for retaining said magnet energized after such a break as long as the train travels at a speed between a predetermined maximum and minimum, and means for retaining said magnet energized at speeds from 0 to said minimum.

7. In a train control system, the combination with a normally closed circuit including an electromagnetic train stop, of means for breaking said circuit under desired conditions, means for retaining said magnet energized after such a break as long as the train travels at a speed between a predetermined maximum and minimum, a branch circuit including a manually operated switch, by which said magnet may be retained energized while the train travels at speeds from 0 to said minimum, if said switch is closed.

8. In a train control system, the combination with a normally closed circuit including an electromagnetic train stop, of means for giving proceed, caution and danger signals, one of which is always in evidence, means for breaking said circuit at the same time said danger signal is given, a speed control governor and means associated therewith for retaining said magnet energized after said break as long as the speed of the train does not exceed a predetermined maximum, the circuit energizing said stop magnet while the proceed or caution signals are in evidence being independent of said speed control governor.

9. In a train control system, the combination with a normally energized electromagnetic train stop, of means for breaking the normal circuit of said stop at desired times, a speed controlled device, and two pair of contact members associated therewith and included in the operating circuits of said stop magnet, one pair of said contacts being closed to retain said magnet energized as long as the train travels at speeds between a predetermined maximum and minimum, and the other pair being closed likewise to retain said magnet energized while the train travels at speeds below said minimum.

10. In a train control system, the combination with a normally closed circuit including an electromagnetic train stop, of means for breaking said circuit under desired conditions, a speed control governor, means associated therewith for keeping said stop magnet energized after such a break as long as the train travels at speeds between a predetermined maximum and minimum, and a branch circuit including a manually operated switch by which said stop magnet may be kept energized after such break while the train travels at speeds from 0 to said minimum.

11. In a train control system, the combination with a plurality of ramps forming distant and home signal points, of a member carried by the train and adapted to make contact with said ramps, means for causing a proceed signal to be displayed when a distant ramp is electrically alive, and a caution signal when said ramp is dead, means for causing a proceed signal to be displayed when a home ramp is alive and a danger signal when it is dead, and means for automatically stopping the train when said danger signal is being displayed if the speed of the train exceeds a predetermined maximum.

12. In a train control system, the combination with a normally closed circuit including an electromagnetic train stop, of proceed, caution and danger signals, a plurality of ramps forming distant and home signal points, a member carried by the train and adapted to make contact with said ramps, a circuit breaker operated by the displacement of said member by the ramps, means for causing the proceed signal to be displayed at every live distant ramp, and the caution signal at every dead distant ramp, said home ramps being arranged to cause said circuit breaker to break said normally closed circuit, a branch circuit to maintain said stop magnet energized after said break if the ramp is alive, means for causing the danger signal to be displayed if the ramp is dead, and a branch circuit, independent of said first named branch circuit, for maintaining said stop magnet energized after and while the danger signal is displayed, as long as the speed of the train does not exceed a predetermined maximum.

13. In a train control system, the combination with a normally closed circuit including an electromagnetic train stop, of a plurality of normally energized ramps, a member carried by the train and adapted to make contact with said ramps, a detector relay in series with said member and the track rails, a plurality of self retaining relays in series with the contacts of said detector relay, a parallel circuit including contacts of said detector relay for temporarily energizing said stop magnet, and a choke coil in series with the circuit comprising said detector relay, member and rails.

14. In a train control system, the combination with a plurality of signals, of a plurality of ramps forming distant and home signal points, a member carried by the train and adapted to make contact with said ramps, a circuit breaker operated by said member, an open circuit relay in series with said member and actuated at every live ramp, a plurality of self retaining relays excited by said first mentioned relay and cooperating to operate said signals, said self retaining relays being deënergized by said circuit breaker under desired conditions, and a choke coil in series with said first mentioned relay.

15. In a train control system, the combination with proceed, danger and caution signals, of a plurality of self retaining relays arranged to control circuits for said signals and having front and back contacts, said proceed signal being connected with the front contacts of said relays, said caution signal being connected with the back contact of one of said relays and the front contact of another of said relays, said danger signal being connected with the back contact of said last mentioned relay.

16. In a train control system, the combination with a plurality of ramps forming distant and home signal points, of a member for engaging said ramps, a circuit breaker operated by the displacement of said member, a normally closed circuit, including an electromagnetic train stop, broken at every home ramp, a relay energized at every energized distant ramp, two other relays energized by said first relay to display a proceed signal, means whereby said first named relay is deënergized and said last named relays remain energized after a distant ramp is passed, a normally open circuit for said electromagnetic train stop closed by said first named relay when said normally closed circuit is broken at a home ramp, if the latter is energized, means whereby one of said two relays opens if a distant ramp is dead to display a caution signal, and means whereby all three relays are deënergized at a dead home ramp, thereby to display a stop signal and to operate said automatic stop.

17. In a train control system, the combination with a plurality of ramps forming distant and home signal points, of a member for engaging said ramps, a circuit breaker operated by the displacement of said member, a normally closed circuit, including an automatic electromagnetic train stop, broken at every home ramp, a relay energized at every energized distant ramp, two other relays energized by said first relay to display a proceed signal, means whereby said first named relay is deënergized and said last named relays remain energized after a distant ramp is passed, a normally open circuit for said electromagnetic train stop closed by said first named relay when said normally closed circuit is broken at a home ramp, if the latter is energized, means whereby one of said two relays opens if a distant ramp is dead to display a caution signal, means whereby all three relays are deënergized at a dead home ramp thereby tending to operate said automatic stop, and means including a speed controlled device whereby the circuit of said automatic stop remains closed as long as the train travels below a predetermined speed.

In witness whereof, I have hereunto subscribed my name in the presence of two witnesses.

ADIEL YEAMAN DODGE.

Witnesses:
 E. R. KING,
 H. MONROE HUMASON.